United States Patent [19]
Bruehl et al.

[11] Patent Number: 5,051,835
[45] Date of Patent: Sep. 24, 1991

[54] DIGITAL PROCESSING OF THEATRICAL FILM

[75] Inventors: Thomas L. Bruehl, Burbank; Daniel R. Brewer, La Canada; Clifford C. Hay, Burbank; William H. Childers, Los Angeles, all of Calif.

[73] Assignee: Paramount Pictures Corporation, Hollywood, Calif.

[21] Appl. No.: 430,557

[22] Filed: Nov. 1, 1989

[51] Int. Cl.⁵ .............................................. H04N 9/79
[52] U.S. Cl. .................................. 358/311; 358/334; 358/81; 352/85
[58] Field of Search ...................... 358/81, 82, 76, 54, 358/334, 311; 360/3; 352/67, 85, 91 R

[56] References Cited
U.S. PATENT DOCUMENTS

| 4,278,995 | 7/1981 | Fearnside et al. | 358/54 |
| 4,418,358 | 11/1983 | Poetsch et al. | 358/54 X |
| 4,553,176 | 11/1985 | Mendrala | 358/334 |
| 4,597,006 | 7/1986 | Orsburn | 358/54 |
| 4,771,343 | 9/1988 | Takenaka | 360/3 X |
| 4,797,712 | 1/1989 | Hayashi et al. | 358/76 X |
| 4,866,513 | 9/1989 | Takahashi | 358/76 |

Primary Examiner—James J. Groody
Assistant Examiner—Mark R. Powell
Attorney, Agent, or Firm—Lyon & Lyon

[57] ABSTRACT

A system for processing images in digital format for use on theatrical film. Three digital cameras record RGB image components in a frame-by-frame basis. These components are stored and presented to an image processor for manipulation as may be desired. The image processor includes real time digital discs and color monitors for viewing processed images. Images thus processed may be returned to storage and recombined through printing in superposition using a film recorder.

3 Claims, 1 Drawing Sheet

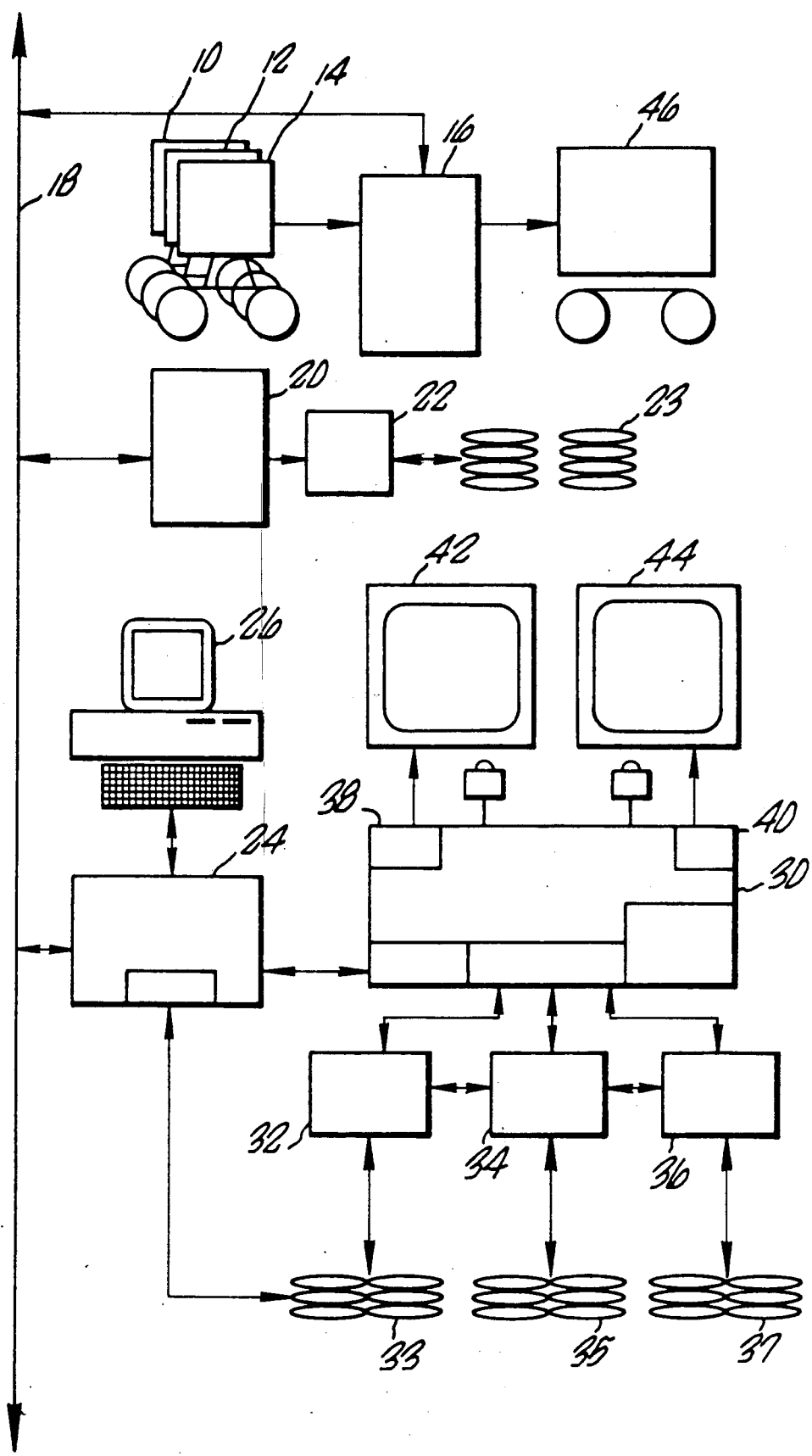

DIGITAL PROCESSING OF THEATRICAL FILM

BACKGROUND OF THE INVENTION

The field of the present invention is the manipulation and enhancement of theatrical film images.

Currently, the principal method of processing theatrical film for visual effects is manual preparation and assembly. To achieve special effects for theatrical quality analog film, analog processing has been employed. A process for creating a typical effect could consist of an artist physically painting an image on the film in combination with the film technician overlaying a matte to comprise an element of the picture. Other effects performed in the analog realm for the creation of theatrical film include, but are not limited to, fades, dissolves, optical zooms and superimposures. It is not uncommon that a process for creating a single frame of film requires five or six processing steps to achieve the desired effect. At 24 frames of film per second of motion picture, work may take days if not weeks to complete, is frequently quite labor intensive and can be tedious. Thus, a principal drawback of the current process is that an enormous amount of time and money are spent in order to achieve a final product.

These current methods of performing optical work are conducted by means of an optical printer designed in 1943. This optical printer is known as the Acme-Dunn Optical Printer. The basic design has been substantially enhanced and modified over the years but the equipment and time required to perform the effects of today are primarily based on this 1943 technology operating in an analog mode.

Digitizing of film has been undertaken. Such undertakings have found both military and civilian application. However, such digitizing has typically been for purposes of transmission and has been limited to still pictures typically without the quality required for theatrical film. Analog printing of digital images is also known. However, the lack of speed and/or clarity have typically prohibited the use of such operations in the creation of theatrical film.

SUMMARY OF THE INVENTION

The present invention is directed to an image processing system capable of providing optical special effects of a quality acceptable for theatrical film.

In a first aspect of the present invention, input to the system is achieved by electronic cameras which scan and digitize the film into multiple additive color images. Most conveniently, the color components selected are red, green and blue (RGB). When digitized into the separate additive color images, these images are stored in mass storage disc drives on a frame-by-frame basis. Once in this digitized and stored condition, the frame information can be removed from storage, manipulated for special effects and returned to storage. Finally, printing in superposition for each file of a single frame may be undertaken to return the image to a theatrical film format. The separation into additive color images for digital manipulation provides for the maintenance of the quality necessary for theatrical film.

In another aspect of the present invention, both digitizing and subsequent printing are accomplished with each color image having a resolution per frame of no less than about 2,000×2,000 pixels. With the additive color images and a resolution of this magnitude, theatrical film can be produced with visual effects wherein the final images have a quality perceived by the human eye to be equal to that of direct analog theatrical film images.

In a further aspect of the present invention, both digitizing and printing can be coupled with image storage and with image processing through computer networking. Such an arrangement provides the capability for processing images while reading, storing and printing preceding or succeeding frames. Versatility is also achieved for the duplication of equipment to handle the slowest step or steps in the process.

In yet another aspect of the present invention, real time disc drives and color monitors are contemplated for use with the image processing system. Image processing capabilities in such a processing center can presently draw on a variety of programs currently available as well as those yet to be developed which mimic current analog processes.

Through the foregoing, it is an object of the present invention to provide special effects of a theatrical quality on film using digital processing methods much more accurately and rapidly than is accomplished through the present manual systems. Other and further objects and advantages will appear hereinafter.

BRIEF DESCRIPTION OF THE DRAWING

The Figure is a block diagram of a high definition theatrical film optical effects simulator of the present invention.

DETAILED DESCRIPTION OF THE PREFERRED EMBODIMENT

An image processing system is schematically illustrated in the Figure. Input to the system is from various film formats such as 16 mm, 35 mm and 70 mm. Three film cameras 10, 12 and 14, scan and digitize the film into three image files on a frame-by-frame basis. Image files are employed, respectively, for each of a red, a green and a blue (RGB) component of the image on each frame. One such digital imaging camera found appropriate for this purpose are the cameras sold by Kodak under the trademark "EIKONIX". These digital imaging camera systems are capable of providing image files with frame resolution of 2,000×2,000 or 4,000×4,000 pixels. Through these cameras, images on a frame of film is converted from an analog state on the film to a digital state. By using separate color components, each pixel may be recorded by position and intensity. With three component colors, information from the image for each pixel is found in three files each defining location and intensity.

In the foregoing cameras mentioned, light is transmitted through the film. A linear sensor array mounted in the camera takes the light received from the film, perceives it by pixel and establishes an equivalent electrical energy reflective of intensity. One line is scanned at a time using a precision stepper motor and lead screw assembly until the entire image is acquired. Following conversion of the light energy for each pixel into an analog signal, it is then transformed into digital output data. The use of such cameras to scan one color film frame requires about four to five minutes. Using a 2,000×2,000 pixel resolution with RGB images, approximately 12.5 megabytes of storage is required for one full color image.

A host computer 16 receives the digital camera output and is employed to control the cameras 10, 12, 14. A computer contemplated for this operation is a product of DEC sold under the trademark "Micro Vax III". The host computer 16 transmits the data to storage. The transmission of this information is most conveniently handled through a network 18. The proliferation of networks provide a range of choices. Of substantial importance is the compatibility of the network to handle the data generated and to best interface with the host computers required in the system. In the preferred embodiment, a network sold under the trademark "Ethernet" has the capacity and is compatible with the "Micro Vax" computers.

Mass storage may employ a host computer 20 controlling a disc drive system 22. For a ten frame elementary system, it is believed that storage capacity for an image file 23 should be in the neighborhood of 126 megabytes. A host computer 20 similar to that used as the camera controller 16 is preferred. The use of the host computer 20 in association with the network allows access to and from the mass storage for initial storage, printing, and repeated data manipulation.

Also associated with the network 18 is an image processing system. A host computer 24 is equipped with a terminal 26. In this instance, a DEC computer sold under the trademark "Micro Vax II" is appropriate to the task.

Image processing may be through a digital video processor 30 capable of handling $2K \times 2K$ and $4K \times 4K$ pixel images. The processor is preferably an array processor with arithmetic and logical operation capabilities on pixel images. Such systems are available which provide operations in thresholding, minimum and maximum pixel comparisons, resolution of regions of interest and masking. Image array processors and controllers sold by Gould under the trademarks "IP9545" with $4K \times 4K$ pixel resolution and "IP9527" with $2K \times 2K$ pixel resolution are contemplated for use with the preferred embodiment. Associated with the digital video processor 30 may be a warper provided by a hardware geometric transformation unit. Such devices are capable of rapid magnifications and reductions, rotations, image warping, convolutions and distortions known as "rubber sheeting". Also available as part of the digital video processor 30 are auxiliary graphics processors with dedicated programmable hardware to draw points, lines, vectors, polygons and polygon fills.

Associated with the processor 30 are real time digital disk controllers 32, 34 and 36. Each controller is dedicated to a red, green or blue color component. It is believed that disc pairs 33, 35 and 37 having around 800 megabyte disc storage may be adequate for each disc controller. With a $2K \times 2K$ resolution, each RGB component is approximately four megabytes. With an 800 megabyte storage at four megabytes per image, approximately 195 images may be stored. This may be translated into eight seconds of film at a 24 image per second rate.

Also associated with the digital video processor 30 are video output controllers 38 and 40. Two color monitors 42 and 44 are coupled with the video output controllers 38 and 40, respectively. These monitors provide the ability to visually assist in the processing operation by representing the base frame and materials to be added, sequential frames being processed or the like.

To again create theatrical film, a film recorder 46 is associated with the host computer 16. Once images are processed through the processor 30, they are returned to the mass storage 22 controlled by the host 20. These processed frames are then directed to the host computer 16 and to the film recorder 46. The recorder is to be capable of printing in superposition the RGB image components which have been processed at $2,000 \times 2,000$ pixels. A film recorder sold under the trademark "CELCO 8000" by Constantine Engineering Laboratories Company is capable of accomplishing the foregoing task.

In operation, theatrical film is converted to RGB image components on a frame-by-frame basis using the film cameras 10, 12 and 14. The cameras are controlled by a host computer 16 which also directs the digital data therefrom through a network 18 to mass storage 22 controlled by a host computer 20. The stored image components may then be operated upon through loading into an image processor 30 controlled by a host computer 24. Presented in a digital format, the image components admit of multiple editing operations controlled by computer rather than manual operation. The processed images may then be restored for printing by a high resolution film recorder 46. In this way, tedious and repetitive manual operation is avoided in creating special effects. Given sufficient computing capability, substantial reductions in processing time may also be realized.

Accordingly, an image processing system using digital processing for the preparation of theatrical film is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for producing visual effects on theatrical film, comprising the steps of
   digitizing into multiple additive color images a theatrical quality film on a frame-by-frame basis;
   separately storing each additive color image in digitized form;
   separately processing for visual effects the additive color images in digitized form;
   separately storing the additive color images in digitized form;
   printing the processed and stored additive color images in superposition on theatrical film.

2. The method of claim 1 wherein said step of digitizing theatrical quality film is accomplished at around $2,000 \times 2,000$ pixels per image.

3. The method of claim 1 further comprising the step of storing processed multiple additive color images on real time digital discs and combining said stored images on a color monitor.

* * * * *

REEXAMINATION CERTIFICATE (2943rd)
United States Patent [19]
Bruehl et al.

[11] B1 5,051,835
[45] Certificate Issued Jul. 2, 1996

[54] METHOD OF PROCESSING THEATRICAL FILM

[75] Inventors: Thomas L. Bruehl, Burbank; Daniel R. Brewer, La Canada; Clifford C. Hay, Burbank; William H. Childers, Los Angeles, all of Calif.

[73] Assignee: Paramount Pictures Corporation, Hollywood, Calif.

Reexamination Request:
No. 90/003,313, Jan. 18, 1994

Reexamination Certificate for:
Patent No.: 5,051,835
Issued: Sep. 24, 1991
Appl. No.: 430,557
Filed: Nov. 1, 1989

[51] Int. Cl.[6] .................................................. H04N 9/79
[52] U.S. Cl. ........................ 358/311; 358/334; 348/32; 352/85
[58] Field of Search ..................... 358/311, 310, 358/334; 348/32; 352/85; H04N 9/79

[56] References Cited

U.S. PATENT DOCUMENTS

| | | | |
|---|---|---|---|
| 3,504,122 | 3/1970 | Ratliff, Jr. | 348/42 |
| 3,617,626 | 11/1971 | Bluth et al. | |
| 3,772,465 | 11/1973 | Vlahos et al. | |
| 3,852,520 | 12/1974 | Bruch | 358/334 |
| 4,646,166 | 2/1987 | Arlan | 358/334 |
| 4,779,143 | 10/1988 | Oku et al. | 358/334 |

*Primary Examiner*—Tommy P. Chin

[57] ABSTRACT

A system for processing images in digital format for use on theatrical film. Three digital cameras record RGB image components in a frame-by-frame basis. These components are stored and presented to an image processor for manipulation as may be desired. The image processor includes real time digital discs and color monitors for viewing processed images. Images thus processed may be returned to storage and recombined through printing in superposition using a film recorder.

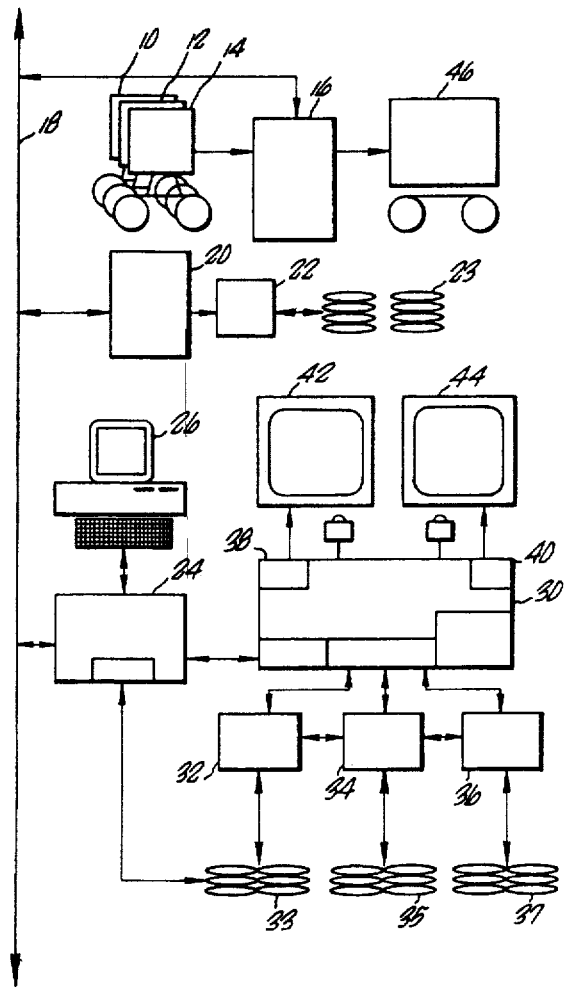

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–5 are cancelled.

* * * * *